United States Patent
Kumar

(10) Patent No.: US 11,507,853 B2
(45) Date of Patent: Nov. 22, 2022

(54) KNOWLEDGE DRIVEN ARCHITECTURE FOR INFORMATION SYSTEM LIFECYCLE DEVELOPMENT AND METHOD TO OPERATE THE SAME

(71) Applicant: Kloudform Ltd, Reading (GB)

(72) Inventor: Shashi Rekha Balamuni Kumar, Earley (GB)

(73) Assignee: Kloudform Ltd

( * ) Notice: Subject to any disclaimer, the term of this patent is extended or adjusted under 35 U.S.C. 154(b) by 511 days.

(21) Appl. No.: 16/733,343

(22) Filed: Jan. 3, 2020

(65) Prior Publication Data

US 2020/0218993 A1 Jul. 9, 2020

Related U.S. Application Data

(60) Provisional application No. 62/788,385, filed on Jan. 4, 2019.

(51) Int. Cl.
*G06N 5/02* (2006.01)
*G06F 16/903* (2019.01)

(52) U.S. Cl.
CPC ............ *G06N 5/022* (2013.01); *G06N 5/025* (2013.01); *G06F 16/903* (2019.01)

(58) Field of Classification Search
None
See application file for complete search history.

(56) References Cited

U.S. PATENT DOCUMENTS

| | | | | |
|---|---|---|---|---|
| 6,493,697 | B1 * | 12/2002 | Stier | G06N 5/025 706/50 |
| 6,499,024 | B1 * | 12/2002 | Stier | G06N 5/022 706/50 |
| 7,752,606 | B2 | 7/2010 | Savage | |
| 9,558,184 | B1 * | 1/2017 | Vanhalle | G06F 16/00 |
| 9,792,530 | B1 | 10/2017 | Wu et al. | |

(Continued)

OTHER PUBLICATIONS

Jörges S, Construction and evolution of code generators: A model-driven and service-oriented approach, 2013, https://patents.google.com/scholar/3035393258005020860.

*Primary Examiner* — Qing Chen
(74) *Attorney, Agent, or Firm* — Jason C. Cameron

(57) ABSTRACT

A knowledge driven architecture for information system lifecycle development is disclosed. The architecture includes a knowledgebase repository including a knowledge engine to store a first set of knowledge models associated with an information system development; an upstream subsystem to feed a second set of knowledge models to the knowledge engine and update the knowledge engine with a final set of knowledge models; a downstream subsystem to provide one or more features corresponding to the information system development to a user. The downstream subsystem includes an engineering knowledge module to systematise one or more aspects of an information system engineering lifecycle and includes a project scaffolding manager to generate code template, an architectural knowledge module to systematise one or more features associated with architecture and design lifecycle of the information system, a planning and governance module to systematise one or more features associated with information system planning and governance life cycle.

18 Claims, 4 Drawing Sheets

(56) References Cited

U.S. PATENT DOCUMENTS

| | | |
|---|---|---|
| 10,073,763 B1 | 9/2018 | Raman et al. |
| 10,430,712 B1 * | 10/2019 | Reed ................... G06N 5/046 |
| 2002/0087496 A1 * | 7/2002 | Stirpe ................... G09B 5/00 |
| | | 706/45 |
| 2008/0071715 A1 * | 3/2008 | Wookey ............... G06Q 10/06 |
| | | 706/45 |
| 2008/0071722 A1 * | 3/2008 | Wookey ................. G06F 8/71 |
| | | 706/61 |
| 2011/0131209 A1 * | 6/2011 | Bechtel ................. G06N 5/025 |
| | | 707/737 |
| 2018/0068271 A1 | 3/2018 | Abebe et al. |

\* cited by examiner

KNOWLEDGE DRIVEN ARCHITECTURE FOR INFORMATION SYSTEM LIFECYCLE DEVELOPMENT AND METHOD TO OPERATE THE SAME

This application claims priority from a provisional patent application filed in the US having Patent Application No. 62/788,385, filed on Jan. 4, 2019 and titled "KNOWLEDGE DRIVEN ARCHITECTURE FOR INFORMATION SYSTEM LIFECYCLE DEVELOPMENT AND METHOD TO OPERATE THE SAME".

BACKGROUND

Embodiment of a present disclosure relates to information system lifecycle development, and more particularly to a knowledge driven architecture for the information system lifecycle development and a method to operate the same.

An information system is a set of instructions, data or programs used to operate computers and execute specific tasks. With proliferation of digital technologies at almost every level of a modern enterprise, the information system have become very complex, as a result of which, the information system development lifecycle also becomes complex. The information system development lifecycle is a term used in systems engineering and information systems to describe a process for planning, creating, testing, and deploying the information system. With the advent of cloud computing and one or more emerging technologies the complexity has increased exponentially. Also, developers, architects, managers and executives often struggle with acquiring, assimilating and using knowledge of new and old concepts which are required to develop the various artefacts in the information development lifecycle such as design documents, architecture and requirement specifications and code. Many times, such knowledge determines not only the quality of the information system, but also speed at which one or more defects are resolved. Various knowledge management systems across the information technology (IT) industries are available which are poorly managed and creates significant risk to business.

As a result, in this context, it is essential to manage knowledge about such systems, concepts and actual facts to not only facilitate a more efficient way of managing the information system development lifecycle, but also using such facts to drive automation of various human tasks involved across this lifecycle. However traditional knowledge management systems such as wiki pages and architecture documentation repositories are usually not updated to reflect the actual state of the system. In addition, the knowledge is not stored in a machine consumable format.

Hence, there is a need for an improved a knowledge driven architecture for the information system lifecycle development and a method to operate the same in order to address the aforementioned issues.

BRIEF DESCRIPTION

In accordance with an embodiment of the present disclosure, a knowledge driven architecture for the information system lifecycle development is disclosed. The architecture includes a knowledgebase repository including a knowledge engine configured to store a first set of knowledge models associated with an information system development in a plurality of forms. The architecture also includes an upstream subsystem operatively coupled to the knowledgebase repository. The upstream subsystem is configured to feed a second set of knowledge models by a knowledge feeder to the knowledge engine and update the knowledge engine with a final set of knowledge models. The architecture also includes a downstream subsystem operatively coupled to the knowledgebase repository. The downstream subsystem is configured to provide one or more features corresponding to the information system development to a user based on the final set of knowledge models. The downstream subsystem includes an engineering knowledge module configured to systematise one or more aspects of an information system engineering lifecycle. The engineering knowledge module includes a project scaffolding manager submodule configured to generate at least one code template for the information system development based on a final set of knowledge models and ontology stored in the knowledgebase repository. The downstream subsystem also includes an architectural knowledge module operatively coupled to the engineering knowledge module. The architectural knowledge module is configured to systematise one or more features associated with architecture and design lifecycle of the information system based on utilisation of the final set of the knowledge models and the ontology stored in the knowledge engine. The architectural knowledge module includes a visualisation manger submodule configured to generate a three-dimensional visualisation view of one or more core knowledge schema and events for one or more occupational stakeholders based on the utilisation of the final set of knowledge models and the ontology stored in the knowledgebase repository. The downstream subsystem also includes a planning and governance module operatively coupled to the architectural knowledge module. The planning and governance module is configured to systematise one or more features associated with information system planning and governance life cycle based on the utilisation of the final set of the knowledge models and the ontology stored in the knowledge engine. The planning and governance module also includes a security manager submodule configured to derive a workflow for risk assessment and risk treatment corresponding to an industrial information security standard based on a combination of the final set of knowledge models, the ontology stored in the knowledgebase repository and one or more external threat and vulnerability databases.

In accordance with another embodiment of the present disclosure, a method to operate the knowledge driven architecture for the information system lifecycle development is disclosed. The method includes storing, in a knowledgebase repository, a first set of knowledge models associated with an information system development in a plurality of forms. The method also includes feeding, by a knowledge feeder of an upstream subsystem, a second set of knowledge models by a knowledge feeder to the knowledge engine and update the knowledge engine with a final set of knowledge models. The method also includes systematising, by an engineering knowledge module, one or more aspects of an information system engineering lifecycle, wherein the engineering knowledge module includes a project scaffolding manager submodule configured to generate at least one code template for the information system development based on a final set of knowledge models and ontology stored in the knowledge engine. The method also includes systematising, by an architectural knowledge module, one or more features associated with architecture and design lifecycle of the information system based on utilisation of the final set of the knowledge models and the ontology stored in the knowledge engine. The method also includes systematising, by a planning and governance module, one or more features associated with information system planning and governance life cycle based on the utilisation of the final set of the knowledge models and the ontology stored in the knowledge engine.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
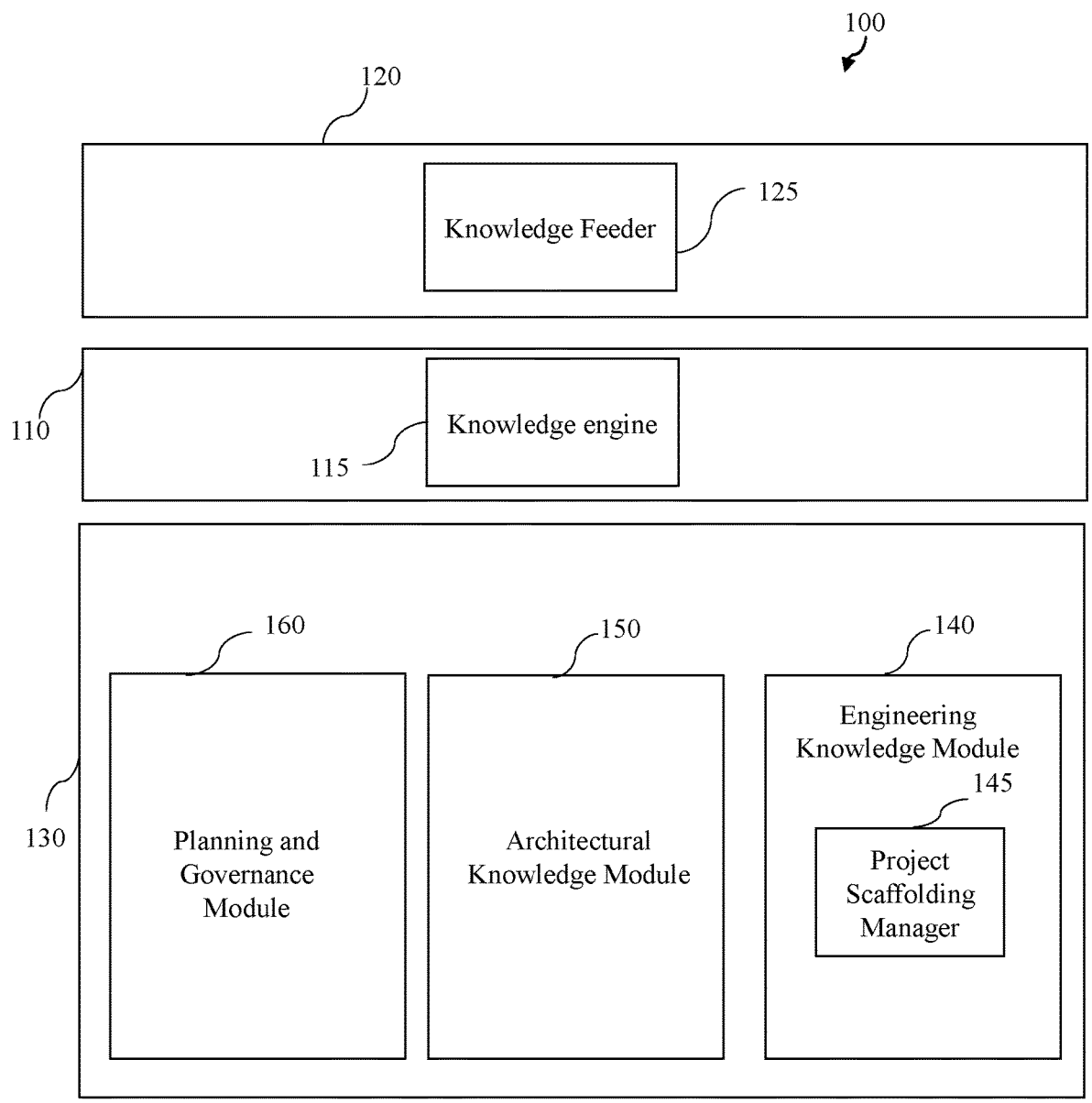
FIG. 1 is a block diagram of a knowledge driven architecture for the information system lifecycle development in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a knowledge driven architecture for the information system lifecycle development and a method to operate the same. The architecture includes a knowledgebase repository including a knowledge engine configured to store a first set of knowledge models associated with an information system development in a plurality of forms. The architecture also includes an upstream subsystem operatively coupled to the knowledgebase repository. The upstream subsystem is configured to feed a second set of knowledge models by a knowledge feeder to the knowledge engine and update the knowledge engine with a final set of knowledge models. The architecture also includes a downstream subsystem operatively coupled to the knowledgebase repository. The downstream subsystem is configured to provide one or more features corresponding to the information system development to a user based on the final set of knowledge models. The downstream subsystem includes an engineering knowledge module configured to systematise one or more aspects of an information system engineering lifecycle. The engineering knowledge module includes a project scaffolding manager submodule configured to generate at least one code template for the information system development based on a final set of knowledge models and ontology stored in the knowledgebase repository. The downstream subsystem also includes an architectural knowledge module operatively coupled to the engineering knowledge module. The architectural knowledge module is configured to systematise one or more features associated with architecture and design lifecycle of the information system based on utilisation of the final set of the knowledge models and the ontology stored in the knowledge engine. The architectural knowledge module includes a visualisation manager submodule configured to generate a three-dimensional visualisation view of one or more core knowledge schema and events for one or more occupational stakeholders based on the utilisation of the final set of knowledge models and the ontology stored in the knowledgebase repository. The downstream subsystem also includes a planning and governance module operatively coupled to the architectural knowledge module. The planning and governance module is configured to systematise one or more features associated with information system planning and governance life cycle based on the utilisation of the final set of the knowledge models and the ontology stored in the knowledge engine. The planning and governance module also includes a security manager submodule configured to derive a workflow for risk assessment and risk treatment corresponding to an industrial information security standard based on a combination of the final set of knowledge models, the ontology stored in the knowledgebase repository and one or more external threat and vulnerability databases.

FIG. 1 is a block diagram of a knowledge driven architecture 100 for the information system lifecycle development in accordance with an embodiment of the present disclosure. The architecture 100 includes a knowledgebase repository 110 including a knowledge engine 115 configured to store a first set of knowledge models associated with an information system development in a plurality of forms. As used herein, the term 'information system' is defined as a software which is a set of instructions, data or programs used to operate computers and execute specific tasks. Similarly, the term 'information system development' is defined as a process of conceiving, specifying, designing, programming, documenting, testing, and bug fixing involved in creating and maintaining frameworks or other information system components. In one embodiment, the first set of knowledge models may include a plurality of knowledge models stored in the knowledge engine. In such embodiment, the plurality of forms of the first set of knowledge models may include at least one of database files, resource description format files, graph database files or a combination thereof. The knowledge repository 110 also includes a knowledge application manager not shown in FIG. 1 operatively coupled to the knowledge engine 115. In one embodiment, the knowledge application manager is configured to manage and control an access to the knowledge engine by providing a predefined role-based access to one or more parts of the first set of the knowledge models. In a specific embodiment, the knowledge repository 110 also includes an administrator manager configured to store metadata required by a rest of the architecture for the information system development. In some embodiments, the metadata required by the rest of the architecture may include users, access permissions, audit logs and the like.

The architecture 100 also includes an upstream subsystem 120 operatively coupled to the knowledgebase repository 110. The upstream subsystem 120 is configured to feed a second set of knowledge models by a knowledge feeder 125 to the knowledge engine 115 and update the knowledge engine 115 with a final set of knowledge models. As used herein, the term 'final set of knowledge models' is defined as a set of models obtained by combination of the knowledge models and data obtained from the external systems. The knowledge feeder 125 is configured to transform external data received from one or more external information systems into a predefined format by using a data transformation technique. The knowledge feeder 125 is also configured to feed transformed external data to the knowledge engine 115 for processing. In one embodiment, the second set of knowledge models may include a plurality of models obtained with data and facts from one or more external systems. The upstream subsystem 120 also includes a knowledge editor configured to update the knowledge engine based on the user input received via a user interface. In one embodiment, the upstream subsystem 120 may also include a knowledge dashboard configured to enable the user to view and monitor a status of a plurality of current state knowledge models. In some embodiments, the knowledge dashboard may provide snapshot view and one or more alerts to the user.

The architecture 100 also includes a downstream subsystem 130 operatively coupled to the knowledgebase repository 110. The downstream subsystem 130 is configured to provide one or more features corresponding to the information system development to a user based on the final set of knowledge models. The downstream subsystem 130 includes an engineering knowledge module 140 configured to systematise one or more aspects of an information system engineering lifecycle. The engineering knowledge module 140 includes a project scaffolding manager 145 submodule configured to generate at least one code template for the information system development based on a final set of knowledge models and ontology stored in the knowledgebase repository. In one embodiment, the project scaffolding manager submodule 145 is configured to bootstrap or accelerate the development and abstract the complex boiler plate code a developer must wire together. The engineering knowledge module 140 also includes a development manager submodule configured to generate development and operations pipeline code for the information system development life cycle based on the final set of the knowledge models and the ontology stored in the knowledgebase repository. In some embodiment, the development manager may abstract the developer from writing complex information technology systematisation scripts or DevOps scripts and wiring them together.

The engineering knowledge module 140 also includes a virtual application manager submodule configured to determine an infrastructure for deployment of the information system based on the utilisation of the final set of the knowledge models, the ontology stored in the knowledgebase repository, a plurality of machine learning models and a predefined set of rules. In one embodiment, the infrastructure may include an on premise infrastructure. In another embodiment, the infrastructure may include a cloud infrastructure. The virtual application manager submodule creates a concept of a virtual application server, wherein the knowledge of the information system, the information system deployment characteristics and the plurality of machine learning models are used to determine how and where the information system should be deployed. For example, in one instance, the virtual application server may decide to deploy the information system to a single server within an organization's data centre. In another instance, the virtual application server may decide to deploy the similar information system on a Kubernetes cluster running on a public cloud instance.

The engineering knowledge module 140 also includes an error manager submodule configured to provide an assistance to an information system developer for resolving one or more errors by providing one or more contexts corresponding to an error code generated during compilation time or during runtime based on one or more factors. In one embodiment, the one or more contexts may include, but not limited to, suggestions of resolution of the one or more errors, one or more external links to code snippets, one or more external links to online discussion forums, one or more links to experts within and outside organisation and the like. In some embodiment, the one or more factors may include but not limited to, a knowledge graph of errors, possible error resolution paths, a database (DB) history of other developers within or outside an organisation facing similar errors and the like.

The engineering knowledge module 140 also includes a virtual data manager submodule configured to generate a logical database schema corresponding to the information system based on the utilisation of the final set of the knowledge models, the ontology stored in the knowledgebase repository and a knowledge graph entity associated with a domain. Based on the logical database schema and one or more additional knowledge models (represent details of a physical database engine), the information system creates objects in these databases to realise the schema. In one embodiment, the physical database engine may include Apache Derby™, MySQL™, POSTGRES™ and the like. The virtual data manager also infers and derives the necessary code and logic to expose these database object access as application programming interfaces (API) via protocols such as http, rest, and protobuf.

The engineering knowledge module 140 also includes an operations manager submodule configured to monitor health and log feed obtained from the information system in runtime and take at least one action based on the utilisation of the final set of knowledge models along with a knowledge graph of one or more operational requirements. In one embodiment, the operations manager submodule may also include machine learning techniques to monitor the health and the log feed obtained from the information system. In some embodiment, the at least one action may include, but not limited to, start, stop or adding additional resources such as memory or disk space and the like. In such embodiment, the one or more operational requirements may include availability, scalability, or resilience and the like.

The downstream subsystem 130 also includes an architectural knowledge module 150 operatively coupled to the engineering knowledge module 140. The architectural knowledge module 150 is configured to systematise one or more features associated with architecture and design lifecycle of the information system based on utilisation of the final set of the knowledge models and the ontology stored in the knowledge engine. The architectural knowledge module 150 includes an architecture scaffolding manager submodule configured to generate at least one architectural documentation corresponding to the information system based on the utilisation of the final set of knowledge models and the ontology stored in the knowledgebase repository. For example, the at least one architectural documentation may include technical architectural diagrams, network diagrams, solution architecture diagrams and the like. Also, the architectural knowledge manager submodule may in some cases infer relationships between components, artefacts, applications and auto generate relevant documentation such as wiki pages with cross referenced architecture links.

In a preferred embodiment, the architectural knowledge module 150 may also include an enterprise architecture manager submodule configured to generate architectural documentation at an enterprise level, including business architecture, application portfolio categorization based on the plurality of knowledge models and ontology stored in the knowledge repository. In one embodiment, the enterprise architecture manager may be configured to create TOGAF artefacts and provide real time visibility the status of design, artefacts and in combination with the operational manager near real time risks may be assessed.

The architectural knowledge module 150 also includes a technical architecture manager submodule configured to generate architectural and design documentation at a code level comprising one or more configuration parameters, actual values across non-production environments based on the final set of the knowledge models and the ontology stored in the knowledgebase repository. The technical architecture manager submodule is also configured to store the values in encrypted vault platform and provide access only to named IP addresses that are stored in the admin manager. The technical architecture manager submodule also provides an audit trail of all parameter and configuration changes.

The architectural knowledge module 150 also includes a domain manager submodule configured to generate architectural and design documentation corresponding to an occupational concern of an organisation and technical domain based on the final set of the knowledge models and the ontology stored in the knowledgebase repository. As used herein, the term 'occupational concern of the organisation' is defined as a business activity of the organisation. In one embodiment, the domain manager may be configured to create business friendly documentation that a domain subject matter expert, a database modeller and business may share.

The architectural knowledge module 150 also includes an event schema submodule configured to generate architectural and design documentation corresponding to one or more events exchanged between the information system and schema of data exchanged through the one or more events based on the final set of the knowledge models and the ontology stored in the knowledgebase repository.

The architectural knowledge module 150 also includes a visualisation manger submodule configured to generate a three-dimensional visualisation view of one or more core knowledge schema and events for one or more occupational stakeholders based on the utilisation of the final set of knowledge models and the ontology stored in the knowledgebase repository.

The downstream subsystem 130 also includes a planning and governance module 160 operatively coupled to the architectural knowledge module 150. The planning and governance module 160 is configured to systematise one or more features associated with information system planning and governance life cycle based on the utilisation of the final set of the knowledge models and the ontology stored in the knowledge engine. The planning and governance module 160 includes a planning manager submodule configured to generate at least one project plan based on a combination of the final set of knowledge models, the ontology stored in the knowledgebase repository and an estimated time of development of one or more individual components of the information system. The planning manager submodule is also configured to enable a project manager to allocate at least one project based on at least one generated project plan. The planning manager submodule combines the final set of knowledge models with estimated development times of individual components to generate the at least one project plan, agile scrum boards etc. along with owners. The planning manager submodule also utilises machine learning models to learn from actual time taken to deliver to adjust future to make them more practical. The planning manager submodule also performs impact analysis based on parameter changes like delays. The planning manager submodule utilises the knowledge engine 115 to make inferences on the impact of changes in schedule, people and the like on the overall project plan. The planning manager submodule also invests time to build in best practices and empirical knowledge of planning aspect such as actual times taken to develop the information systems in the form of the final set of the knowledge models, the ontology and knowledge graphs that are stored in the knowledge engine. The planning manager submodule also infers and deduces project plans as well as impact analysis based on the knowledge.

The planning and governance module 160 also includes a cost and budget manager submodule configured to estimate cost and budgetary estimates, including cost of projects, project over run costs based on the final set of knowledge models and ontology stored in the knowledgebase repository. The cost and budget manager submodule combine the final set of knowledge models with estimated development times of individual components along with costs which include dimensions such as people costs, software licensing to create budgetary and planning estimates. The cost and budget manager submodule also utilises machine learning models to learn from actual costs versus projected budgets to deliver to adjust future budgets to make them more practical. The cost and budget manager submodule also perform impact analysis based on parameter changes such as delays simulating impact in terms of cost. The cost and budget manager submodule use the knowledge engine to make inferences on the impact of changes in schedule, people etc on the overall project budget. The cost and budget manager submodule also invests time to build in best practices and empirical knowledge of planning aspect such as actual costs taken to develop the information systems in the form of the final set of the knowledge models, the ontology and graphs that are stored in the knowledge engine. The cost and budget manager submodule also infers and reduces costs as well as perform impact analysis based on the knowledge.

The planning and governance module 160 also include a security manager submodule configured to derive a workflow for risk assessment and risk treatment corresponding to an industrial information security standard based on a combination of the final set of knowledge models, the ontology stored in the knowledgebase repository and one or more external threat and vulnerability databases.

In a specific embodiment, the planning and governance module 160 may further include an executive command and control manager submodule configured to provide executive leaderships with end to end near real time visibility into projects and application status based on the plurality of knowledge models and ontology stored in the knowledgebase repository 110. The executive command and control manager submodule combine the knowledge base, ontology and data that is used by all the other knowledge applications to provide a drill own dashboard of project status, application status and cost overruns. Such drill down is by the view as defined in the enterprise architecture manager submodule. Because the enterprise architecture manager submodule has a topology of the business architecture itself, executives and leadership can get an aggregated from a single source of truth. In addition, the executive command and control manager submodule makes use of the knowledge engine 115 to provide risk metrics across applications.

Figure 2:
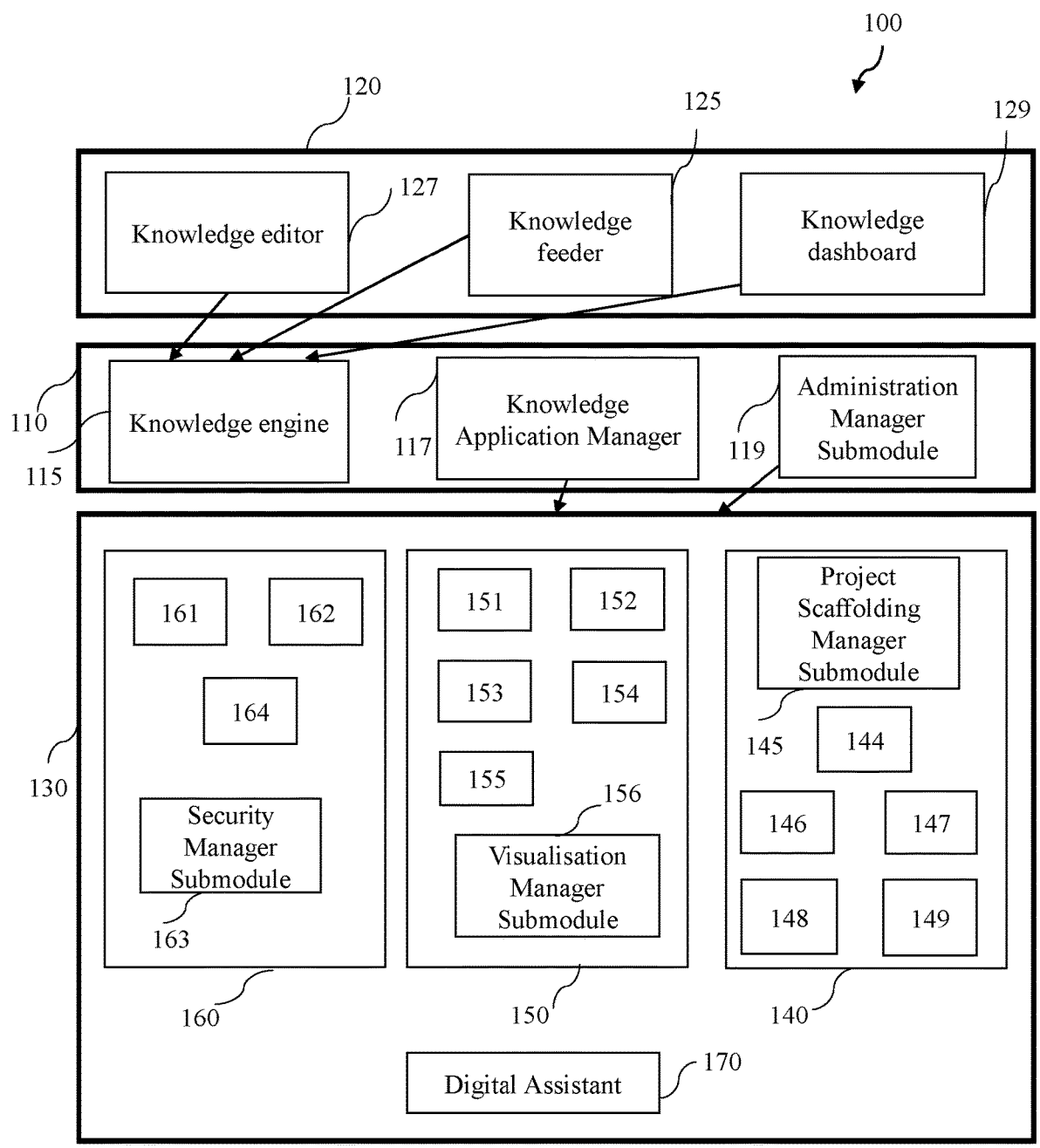
FIG. 2 illustrates a schematic representation of an exemplary embodiment of a knowledge driven architecture for the information system lifecycle development in accordance with an embodiment of the present disclosure.

FIG. 2 illustrates a schematic representation of an exemplary embodiment of a knowledge driven architecture for the information system lifecycle development in accordance with an embodiment of the present disclosure. The information system development lifecycle is a systematic process for building an information system that ensures quality, correctness and aims to meet one or more customer requirements. The information system development lifecycle helps an organisation to reduce one or more business risks by providing faster and valid response to the one or more customer requirements and often comes with eliminating the process bottlenecks and replacing one or more manual tasks with systematisation. For example, suppose an organisation 'A' wants to systematise several stages involved in the information development life cycle for at least one of their developed information systems. In such a scenario, the organisation 'A' may utilise the knowledge driven architecture 100 to systematise a complete process involved in the information development lifecycle.

The architecture 100 in order to systematise the complete process, needs to have access of one or more knowledge models which are applicable for the at least one of the developed information system. The one or more knowledge models may be accessed from a knowledgebase repository 110 of the architecture 100. The knowledgebase repository 110 includes a knowledge engine 115 which stores a first set of knowledge models associated with the information system development in a plurality of forms. Here, the first set of knowledge models includes the one or more knowledge models which are stored in the knowledge engine 115 and applicable for the developed information system. Also, the plurality of forms of the first set of knowledge models may include at least one of database files, resource description format files, graph database files or a combination thereof. The knowledge repository 110 also includes a knowledge application manager 117 operatively coupled to the knowledge engine 115, wherein the knowledge application manager 117 manages and control an access to the knowledge engine 115 by providing a predefined role-based access to one or more parts of the first set of the knowledge models. Again, metadata required by a rest of the architecture such as users, access permissions, audit logs and the like for the information system development is stored by an administrator manager 119.

Now, in order to feed knowledge into the knowledge engine 115, a second set of knowledge models are obtained from one or more external systems and feed into the knowledge engine 115 along with stored first set of knowledge models by a knowledge feeder 125 of an upstream subsystem 120. Here, the second set of knowledge models which are obtained from the one or more external systems are transformed into a predefined format by using a data transformation technique. Upon transformation, such transformed second set of knowledge models are feed into the knowledge engine 115. Also, a user input corresponding to the knowledge models may also be obtained through a knowledge editor 127 of the upstream subsystem 120. For example, the user input may include an input of datasets, an input of a parameter, change in input variables and the like. Again, the upstream subsystem 120 also includes a knowledge dashboard 129 to enable the user to view and monitor a status of a plurality of current state knowledge models. The knowledge engine 115 further gets updated with a final set of knowledge models which is generated upon processing the first set of knowledge models and the second set of knowledge models.

Once, a knowledge base is created, one or more features or end user functionalities corresponding to the information system development is provided by a downstream subsystem 130. The downstream subsystem 130 includes an engineering knowledge module 140 configured to systematise one or more aspects of an information system engineering lifecycle. For example, for the development of the information system, one or more engineering processes which are involved are systematised in order to accelerate the development process. The engineering knowledge module 140 includes a project scaffolding manager submodule 145 configured to generate at least one code template for the information system development based on the final set of knowledge models and ontology stored in the knowledgebase repository. Here, the project scaffolding manager submodule 145 is configured to bootstrap or accelerate the development and abstract the complex boiler plate code a developer must wire together.

Also, the engineering knowledge module 140 includes a development manager 144 systematise the development process by generating development and operations (DevOps) code for the information system development life cycle based on the final set of the knowledge models and the ontology stored in the knowledgebase repository and may abstract the developer from writing complex information technology systematisation scripts or DevOps scripts and wiring them together.

Once, the information system is developed, an infrastructure to deploy the information system of the organisation 'A' is determined by a virtual data application manager submodule 146. Here, the infrastructure may include a cloud infrastructure. Also, the virtual data application manager submodule 146 utilises a plurality of machine learning models to determine how and where the information system should be deployed. Even, one or more errors which are generated during the phase such as runtime or compile time of the information system development, are resolved by providing an assistance to an information system developer based on one or more factors via an error manager submodule 147. For example, the assistance which is provided may include, but not limited to, suggestions of resolution of the one or more errors, one or more external links to code snippets, one or more external links to online discussion forums, one or more links to experts within and outside organisation and the like. Again, the one or more factors may include but not limited to, a knowledge graph of errors, possible error resolution paths, a database (DB) history of other developers within or outside an organisation facing similar errors and the like.

Later, a logical database schema corresponding to the information system is also generated by a virtual data manager 148 based on the utilisation of the final set of the knowledge models, the ontology stored in the knowledgebase repository and a knowledge graph entity associated with a domain. Also, the engineering knowledge module 140 includes an operations manager submodule 149 to monitor health and log feed obtained from the information system in runtime and take at least one action based on the utilisation of the final set of knowledge models along with a knowledge graph of one or more operational requirements. Here, the at least one action may include, but not limited to, start, stop or adding additional resources such as memory or disk space and the like. Similarly, the one or more operational requirements may include availability, scalability, or resilience and the like.

Again, one or more features associated with architecture and design lifecycle of the information system is systematised by an architectural knowledge module 150 based on utilisation of the final set of the knowledge models and the ontology stored in the knowledge engine 115. The architectural knowledge module 150 includes an architecture scaffolding manager submodule 151 configured to generate at least one architectural documentation corresponding to the information system based on the utilisation of the final set of knowledge models and the ontology stored in the knowledgebase repository. Here, the at least one architectural documentation may include technical architectural diagrams, network diagrams, solution architecture diagrams and the like. Also, the architectural knowledge manager submodule 151 may in some cases infer relationships between components, artefacts, applications and auto generate relevant documentation such as wiki pages with cross referenced architecture links.

Again, the architectural knowledge module 150 also include an enterprise architecture manager submodule 152 to generate architectural documentation at an enterprise level, including business architecture, application portfolio categorization based on the plurality of knowledge models and ontology stored in the knowledge repository 110. Similarly, the architectural knowledge module 150 also includes a technical architecture manager submodule 153 configured to generate architectural and design documentation at a code level comprising one or more configuration parameters, actual values across non-production environments based on the final set of the knowledge models and the ontology stored in the knowledgebase repository 110. Also, an architectural and design documentation corresponding to an occupational concern of an organisation and technical domain based on the final set of the knowledge models and the ontology stored in the knowledgebase repository is generated by a domain manager submodule 154. Moreover, architectural and design documentation corresponding to one or more events exchanged between the information system and schema of data exchanged through the one or more events based on the final set of the knowledge models and the ontology stored in the knowledgebase repository is generated by an event schema submodule 155. Further, the architectural knowledge module 150 also includes a visualisation manager submodule 156 configured to generate a three-dimensional visualisation view of one or more core knowledge schema and events for one or more occupational stakeholders based on the utilisation of the final set of knowledge models and the ontology stored in the knowledgebase repository 110.

In order to provide the one or more features by the downstream subsystem 130, systematisation of one or more aspects associated with information system planning and governance life cycle based on the utilisation of the final set of the knowledge models and the ontology stored in the knowledge engine 115 is done by a planning and governance module 160. The planning and governance module 160, includes a planning manager submodule 161 to generate at least one project plan based on a combination of the final set of knowledge models, the ontology stored in the knowledgebase repository 110 and an estimated time of development of one or more individual components of the information system. The planning manager submodule 161 is also configured to enable a project manager to allocate at least one project based on at least one generated project plan. The planning manager submodule 161 combines the final set of knowledge models with estimated development times of individual components to generate the at least one project plan, agile scrum boards etc. along with owners. Here, the planning manager submodule 161 utilises the plurality of machine learning models to learn from actual time taken to deliver to adjust future to make them more practical.

For planning of the information system development, the organisation 'A' by utilising a cost and budget manager submodule 162. The cost and budget manager submodule 162 estimates cost and budgetary estimates, including cost of projects, project over run costs based on the final set of knowledge models and ontology stored in the knowledgebase repository 110. The cost and budget manager submodule 162 also combines the final set of knowledge models with estimated development times of individual components along with costs which include dimensions such as people costs, software licensing to create budgetary and planning estimates. The cost and budget manager submodule 162 also utilises machine learning models to learn from actual costs versus projected budgets to deliver to adjust future budgets to make them more practical.

The planning and governance module 160 also includes a security manager submodule 163 configured to derive a workflow for risk assessment and risk treatment corresponding to an industrial information security standard based on a combination of the final set of knowledge models, the ontology stored in the knowledgebase repository and one or more external threat and vulnerability databases.

In addition to, executive leaderships with end to end near real time visibility into projects and application status based on the plurality of knowledge models and ontology stored in the knowledgebase repository 110 is provided by an executive command and control manager submodule 164. Here, the executive command and control manager submodule 164 provide a drill own dashboard of project status, information system status, cost overruns and risk metrics across applications.

Further, the downstream subsystem 130 also includes a digital assistant 170 to provide the end user functionalities by interaction with the end-user through a user interface at multiple phases of the information system development lifecycle such as auto generating code templates, auto generating documents, autonomic capabilities such as auto deployment of code, auto healing and the like. Also, the digital assistant 170 suggests one or more solutions corresponding to one or more queries associated with the information system development which are obtained from the end user. So, overall, the architecture 100 for the systematising the information system development lifecycle helps in providing streamlined knowledge management and reduces the business risk for any organisations by meeting the one or more customer requirements in an understandable manner.

Figure 3:
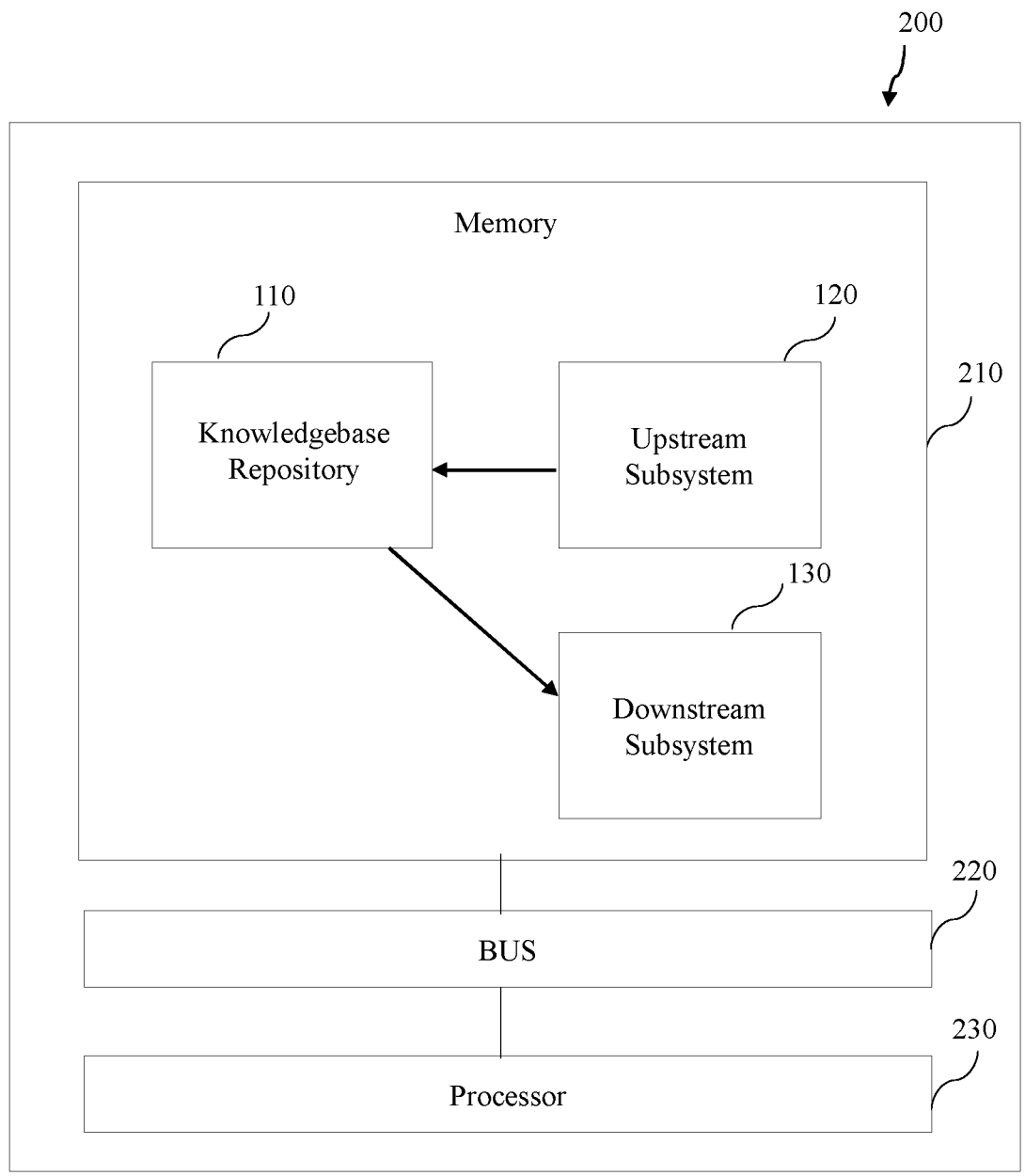
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220.

The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of subsystems stored in the form of executable program which instructs the processor 230 to perform the method steps illustrated in FIG. 1. The memory 210 is substantially similar to an architecture 100 of FIG. 1. The memory 210 has following subsystems: a knowledge repository 110, an upstream subsystem 120 and a downstream subsystem 130.

The architecture 100 includes a knowledgebase repository 110 including a knowledge engine configured to store a first set of knowledge models associated with an information system development in a plurality of forms. The upstream subsystem 120 is configured to feed a second set of knowledge models by a knowledge feeder to the knowledge engine and update the knowledge engine with a final set of knowledge models. The downstream subsystem 130 is configured to provide one or more features corresponding to the information system development to a user based on the final set of knowledge models. The downstream subsystem 130 includes an engineering knowledge module configured to systematise one or more aspects of an information system engineering lifecycle. The engineering knowledge module includes a project scaffolding manager submodule configured to generate at least one code template for the information system development based on a final set of knowledge models and ontology stored in the knowledgebase repository. The downstream subsystem 130 also includes an architectural knowledge module configured to systematise one or more features associated with architecture and design lifecycle of the information system based on utilisation of the final set of the knowledge models and the ontology stored in the knowledge engine. The downstream subsystem 130 also includes a planning and governance module configured to systematise one or more features associated with information system planning and governance life cycle based on the utilisation of the final set of the knowledge models and the ontology stored in the knowledge engine.

The bus 220 as used herein refers to be internal memory channels or computer network that is used to connect computer components and transfer data between them. The bus 220 includes a serial bus or a parallel bus, wherein the serial bus transmit data in bit-serial format and the parallel bus transmit data across multiple wires. The bus 220 as used herein, may include but not limited to, a system bus, an internal bus, an external bus, an expansion bus, a frontside bus, a backside bus and the like.

Figure 4:
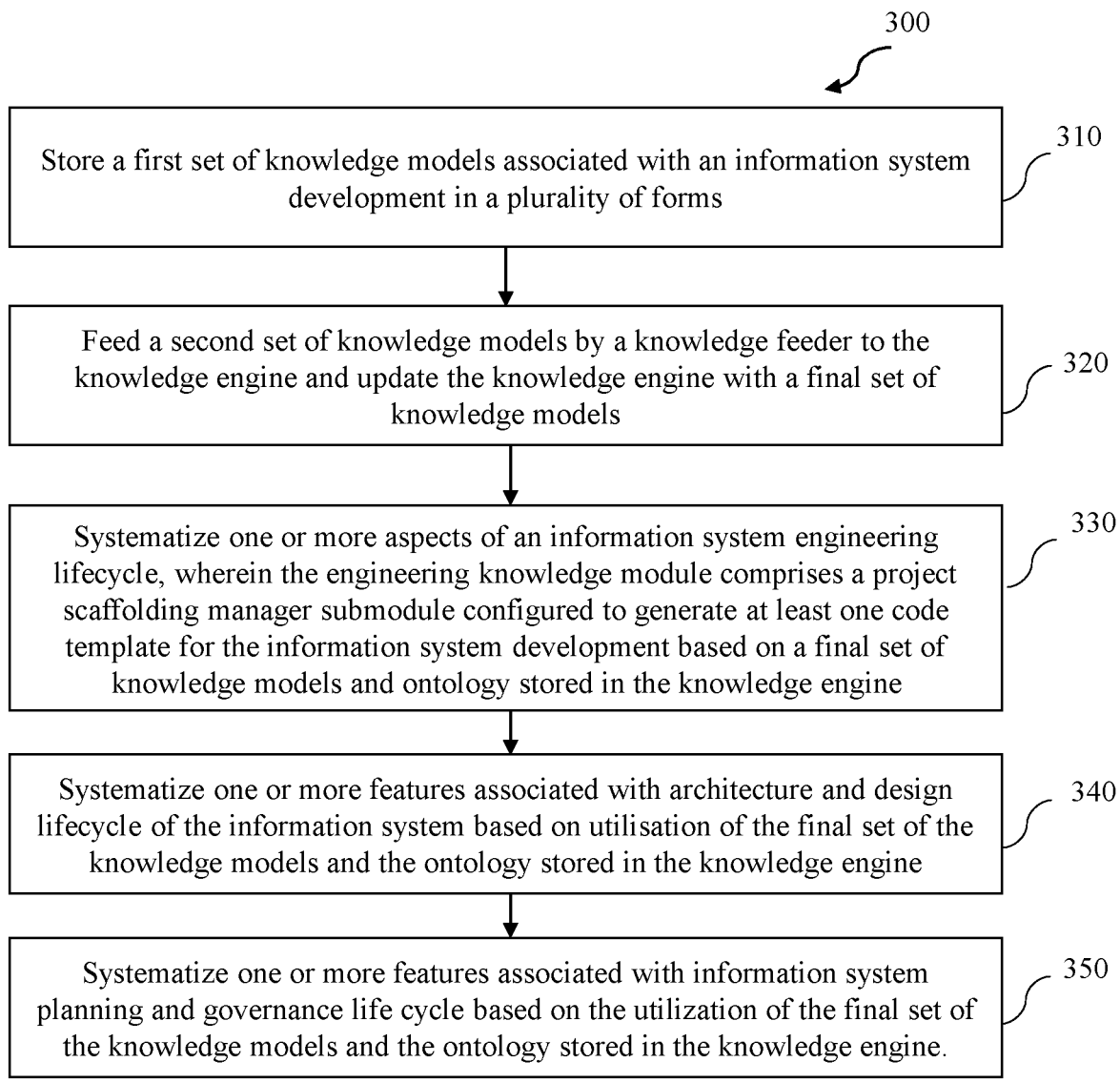
FIG. 4 is a flow chart representing the steps involved in a method to operate a knowledge driven architecture for the information system lifecycle development of FIG. 1 in accordance with the embodiment of the present disclosure.

FIG. 4 is a flow chart representing the steps involved in a method 300 to operate a knowledge driven architecture for the information system lifecycle development of FIG. 1 in accordance with the embodiment of the present disclosure. The method 300 includes storing, in a knowledgebase repository, a first set of knowledge models associated with an information system development in a plurality of forms in step 310. In one embodiment, storing the first set of knowledge models associated with the information system development may include storing the first set of knowledge models in at least one of database files, resource description format files, graph database files or a combination thereof. In some embodiment, the method 300 also includes providing, by a knowledge application manger, a predefined role-based access to one or more parts of the first set of the knowledge models. In a specific embodiment, the method also includes storing, by an administrator manager, metadata required by a rest of the architecture for the information system development. In some embodiments, the metadata required by the rest of the architecture may include users, access permissions, audit logs and the like.

The method 300 also includes feeding, by a knowledge feeder of an upstream subsystem, a second set of knowledge models by a knowledge feeder to the knowledge engine and update the knowledge engine with a final set of knowledge models in step 320. In one embodiment, feeding the second set of knowledge models by the knowledge feeder to the knowledge engine and updating the knowledge engine with the final set of knowledge models may include feeding the second set of knowledge models, wherein the second set of knowledge models may include data and facts obtained from one or more external systems.

The method 300 also includes systematising, by an engineering knowledge module, one or more aspects of an information system engineering lifecycle, wherein the engineering knowledge module comprises a project scaffolding manager submodule configured to generate at least one code template for the information system development based on a final set of knowledge models and ontology stored in the knowledge engine in step 330. In one embodiment, systematising the one or more aspects of the information system engineering lifecycle by generating the at least one code template for the information system development may include generating the at least one code template for the information system development by a project scaffolding manager submodule based on a final set of knowledge models and ontology stored in the knowledgebase repository. In some embodiment, systematising the one or more aspects of the information system engineering lifecycle may also include generating, by a development manager, development and operations (DevOps) pipeline code for the information system development life cycle based on the final set of the knowledge models and the ontology stored in the knowledgebase repository.

In another embodiment, systematising the one or more aspects of the information system engineering lifecycle may also include determining, by a virtual application manager submodule, an infrastructure for deployment of the information system based on the utilisation of the final set of the knowledge models, the ontology stored in the knowledgebase repository, a plurality of machine learning models and a predefined set of rules. In yet another embodiment, systematising the one or more aspects of the information system engineering lifecycle may also include providing, by an error manager submodule, an assistance to an information system developer for resolving one or more errors by providing one or more contexts corresponding to an error code generated during compilation time or during runtime based on one or more factors.

The method 300 also includes systematising, by an architectural knowledge module, one or more features associated with architecture and design lifecycle of the information system based on utilisation of the final set of the knowledge models and the ontology stored in the knowledge engine in step 340. In one embodiment, systematising the one or more features associated with architecture and design lifecycle of the information system may include generating, by an architecture scaffolding manager submodule, at least one architectural documentation corresponding to the information system based on the utilisation of the final set of knowledge models and the ontology stored in the knowledgebase repository. In some embodiment, systematising the one or more features associated with the architecture and design lifecycle of the information system may include generating, by an enterprise architecture manager submodule, architectural documentation at an enterprise level, including business architecture, application portfolio categorization based on the plurality of knowledge models and ontology stored in the knowledge repository.

In another embodiment, systematising the one or more features associated with the architecture and design lifecycle of the information system may include generating, by a technical architecture manager submodule, architectural and design documentation at a code level comprising one or more configuration parameters, actual values across non-production environments based on the final set of the knowledge models and the ontology stored in the knowledgebase repository. In yet another embodiment, systematising the one or more features associated with the architecture and design lifecycle of the information system may include generating, by a domain manager submodule, architectural and design documentation corresponding to an occupational concern of an organisation and technical domain based on the final set of the knowledge models and the ontology stored in the knowledgebase repository.

The method 300 also includes systematising, by a planning and governance module, one or more features associated with information system planning and governance life cycle based on the utilisation of the final set of the knowledge models and the ontology stored in the knowledge engine in step 350. In one embodiment, systematising the one or more features associated with the information system planning and governance life cycle may include generating, by a planning manager submodule, at least one project plan based on a combination of the final set of knowledge models, the ontology stored in the knowledgebase repository and an estimated time of development of one or more individual components of the information system. In such embodiment, the planning manager submodule is also configured to enable a project manager to allocate at least one project based on at least one generated project plan. In another embodiment, systematising the one or more features associated with the information system planning and governance life cycle may include estimating, by a cost and budget manager submodule, cost and budgetary estimates, including cost projects, project over run costs based on the final set of knowledge models and ontology stored in the knowledgebase repository.

In yet another embodiment, systematising the one or more features associated with the information system planning and governance life cycle may include deriving, by a security manager submodule, a workflow for risk assessment and risk treatment corresponding to an industrial information security standard based on a combination of the final set of knowledge models, the ontology stored in the knowledgebase repository and one or more external threat and vulnerability databases. In one embodiment, systematising the one or more features associated with the information system planning and governance life cycle may further include providing, by an executive command and control manager submodule, executive leaderships with end to end near real time visibility into projects and application status based on the plurality of knowledge models and ontology stored in the knowledge repository module Various embodiments of the present disclosure provides the knowledge driven architecture to systematise the process of the information system development lifecycle and helps in streamlined knowledge management.

Moreover, the present disclosed architecture lowers the cost of the information system development utilisation for systematisation of time-consuming tasks like maintaining documents, scaffolding complex cloud native code, error management, deployment operations and the like and as a result it becomes easily affordable for the information system development lifecycle.

Furthermore, the present disclosed architecture reduces business risk as a hyper systematised information system pipeline driven from a single source of truth is more maintainable, has higher code quality and less human errors and makes the architecture reliable for utilisation in systematisation of the information development lifecycle.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A knowledge driven architecture for an information system lifecycle development comprising:
one or more processors; and a memory, communicatively coupled to the one or more processors, storing:
- a knowledgebase repository comprising a knowledge engine configured to store a first set of knowledge models associated with an information system lifecycle development in a plurality of forms;
- an upstream subsystem operatively coupled to the knowledgebase repository, wherein the upstream subsystem is configured to feed a second set of knowledge models associated with the information system lifecycle development by a knowledge feeder to the knowledge engine and update the knowledge engine with a final set of knowledge models; and
- a downstream subsystem operatively coupled to the knowledgebase repository, wherein the downstream subsystem is configured to provide one or more features corresponding to the information system lifecycle development to a user based on the final set of the knowledge models, and wherein the downstream subsystem comprises:
  - an engineering knowledge module configured to systematise one or more aspects of an information system engineering lifecycle, wherein the engineering knowledge module comprises a project scaffolding manager submodule configured to generate at least one code template for the information system lifecycle development based on a final set of knowledge models and ontology stored in the knowledge engine;
  - an architectural knowledge module operatively coupled to the engineering knowledge module, wherein the architectural knowledge module is configured to systematise one or more features associated with architecture and design lifecycle of the information system based on utilisation of the final set of the knowledge models and the ontology stored in the knowledge engine; and
  - a planning and governance module operatively coupled to the architectural knowledge module, wherein the planning and governance module is configured to systematise one or more features associated with information system planning and governance lifecycle based on the utilisation of the final set of the knowledge models and the ontology stored in the knowledge engine.

2. The knowledge driven architecture of claim 1, wherein the plurality of forms of the first set of the knowledge models comprises at least one of database files, resource description format files, graph database files, or a combination thereof.

3. The knowledge driven architecture of claim 1, wherein the knowledgebase repository comprises a knowledge application manager configured to manage and control an access to the knowledge engine by providing a predefined role-based access to one or more parts of the first set of the knowledge models.

4. The knowledge driven architecture of claim 1, wherein the knowledgebase repository comprises an administration manager configured to store metadata required by the knowledge driven architecture for the information system lifecycle development.

5. The knowledge driven architecture of claim 1, wherein the engineering knowledge module comprises a development manager submodule configured to generate development and operations pipeline code for the information system lifecycle development based on the utilisation of the final set of the knowledge models and the ontology stored in the knowledge engine.

6. The knowledge driven architecture of claim 1, wherein the engineering knowledge module comprises a virtual application manager submodule configured to determine an infrastructure for deployment of the information system based on the utilisation of the final set of the knowledge models and the ontology stored in the knowledge engine, a plurality of machine learning models, and a predefined set of rules.

7. The knowledge driven architecture of claim 1, wherein the engineering knowledge module comprises an error manager submodule configured to provide an assistance to an information system developer for resolving one or more errors by providing one or more contexts corresponding to an error code generated during compilation time or during runtime based on one or more factors.

8. The knowledge driven architecture of claim 1, wherein the engineering knowledge module comprises a virtual data manager submodule configured to generate a logical database schema corresponding to the information system based on the utilisation of the final set of the knowledge models and the ontology stored in the knowledge engine and a knowledge graph entity associated with a domain.

9. The knowledge driven architecture of claim 1, wherein the engineering knowledge module comprises an operations manager submodule configured to monitor health and log feed obtained from the information system in runtime and take at least one action based on the utilisation of the final set of the knowledge models and the ontology stored in the knowledge engine along with a knowledge graph of one or more operational requirements.

10. The knowledge driven architecture of claim 1, wherein the architectural knowledge module comprises an architecture scaffolding manager submodule configured to generate at least one architectural documentation corresponding to the information system based on the utilisation of the final set of the knowledge models and the ontology stored in the knowledge engine.

11. The knowledge driven architecture of claim 1, wherein the architectural knowledge module comprises a technical architecture manager submodule configured to generate architectural and design documentation at a code level comprising one or more configuration parameters, actual values across non-production environments based on the utilisation of the final set of the knowledge models and the ontology stored in the knowledge engine.

12. The knowledge driven architecture of claim 1, wherein the architecture knowledge module comprises a domain manager submodule configured to generate architectural and design documentation corresponding to an occupational concern of an organisation and technical domain based on the utilisation of the final set of the knowledge models and the ontology stored in the knowledge engine.

13. The knowledge driven architecture of claim 1, wherein the architectural knowledge module comprises an event schema submodule configured to generate architectural and design documentation corresponding to one or more events exchanged between the information system and schema of data exchanged through the one or more events based on the utilisation of the final set of the knowledge models and the ontology stored in the knowledge engine.

14. The knowledge driven architecture of claim 1, wherein the architectural knowledge module comprises a visualisation manager submodule configured to generate a three-dimensional visualization view of one or more core knowledge schema and events for one or more occupational stakeholders based on the utilisation of the final set of the knowledge models and the ontology stored in the knowledge engine.

15. The knowledge driven architecture of claim 1, wherein the planning and governance module comprises a planning manager submodule configured to:
  generate at least one project plan based on a combination of the final set of the knowledge models and the ontology stored in the knowledge engine and an estimated time of development of one or more individual components of the information system; and
  enable a project manager to allocate at least one project based on at least one generated project plan.

16. The knowledge driven architecture of claim 1, wherein the planning and governance module comprises a cost and budget manager submodule configured to estimate cost and budgetary estimates, including cost projects, project over run costs based on the utilisation of the final set of the knowledge models and the ontology stored in the knowledge engine.

17. The knowledge driven architecture of claim 1, wherein the planning and governance module comprises a security manager submodule configured to derive a workflow for risk assessment and risk treatment corresponding to an industrial information security standard based on a combination of the final set of the knowledge models and the ontology stored in the knowledge engine and one or more external threat and vulnerability databases.

18. A method comprising:
  storing, in a knowledgebase repository comprising a knowledge engine, a first set of knowledge models associated with an information system lifecycle development in a plurality of forms;
  feeding, by a knowledge feeder of an upstream subsystem operatively coupled to the knowledgebase repository, a second set of knowledge models associated with the information system lifecycle development to the knowledge engine and update the knowledge engine with a final set of knowledge models;
  providing, by a downstream subsystem operatively coupled to the knowledgebase repository, one or more features corresponding to the information system lifecycle development to a user based on the final set of the knowledge models;
  systematising, by an engineering knowledge module of the downstream subsystem, one or more aspects of an information system engineering lifecycle, wherein the engineering knowledge module comprises a project scaffolding manager submodule configured to generate at least one code template for the information system lifecycle development based on a final set of knowledge models and ontology stored in the knowledge engine;
  systematising, by an architectural knowledge module of the downstream subsystem and operatively coupled to the engineering knowledge module of the downstream subsystem, one or more features associated with architecture and design lifecycle of the information system based on utilisation of the final set of the knowledge models and the ontology stored in the knowledge engine; and
  systematising, by a planning and governance module of the downstream subsystem and operatively coupled to the architectural knowledge module of the downstream subsystem, one or more features associated with information system planning and governance lifecycle based on the utilisation of the final set of the knowledge models and the ontology stored in the knowledge engine.

* * * * *